(12) United States Patent
Xu et al.

(10) Patent No.: US 10,659,777 B2
(45) Date of Patent: *May 19, 2020

(54) CROSS-CHANNEL RESIDUAL PREDICTION

(71) Applicant: Intel Corporation, Santa Clara, CA (US)

(72) Inventors: Lidong Xu, Beijing (CN); Yi-Jen Chiu, San Jose, CA (US); Yu Han, Beijing (CN); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,397

(22) Filed: Sep. 11, 2018

(65) Prior Publication Data
US 2019/0098294 A1 Mar. 28, 2019

Related U.S. Application Data

(63) Continuation of application No. 14/244,364, filed on Apr. 3, 2014, now Pat. No. 10,075,709, which is a (Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/117* (2014.11); *H04N 19/159* (2014.11);
(Continued)

(58) Field of Classification Search
CPC .. H04N 19/105; H04N 19/117; H04N 19/159; H04N 19/176; H04N 19/61; H04N 19/186
See application file for complete search history.

(56) References Cited

U.S. PATENT DOCUMENTS 6,785,425 B1 * 8/2004 Feder ............... H04N 1/648
375/E7.265
8,126,053 B2 * 2/2012 Song ............... H04N 19/105
375/240.12
(Continued)

FOREIGN PATENT DOCUMENTS

CN 1574970 2/2005
CN 1777283 5/2006
(Continued)

OTHER PUBLICATIONS

Zhang et al., Multi-order-residual (MOR) video coding: framework, analysis, and performance, Proc. SPIE 7744, Visual Communications and Image Processing 2010, 774411 (Aug. 4, 2010); doi: 10.1117/12.863332 (Year: 2010).*
(Continued)

*Primary Examiner* — Richard A Hansell, Jr.
(74) *Attorney, Agent, or Firm* — Green, Howard & Mughal LLP

(57) ABSTRACT

Systems, apparatus and methods are described including determining a prediction residual for a channel of video data; and determining, using the first channel's prediction residual, a prediction residual for a second channel of the video data. Further, a prediction residual for a third channel of the video data may be determined using the second channel's prediction residual.

18 Claims, 9 Drawing Sheets

Related U.S. Application Data continuation of application No. 13/977,420, filed as application No. PCT/CN2011/081862 on Nov. 7, 2011, now Pat. No. 10,015,485.

(51) Int. Cl.

| | | |
|---|---|---|
| H04N 19/176 | (2014.01) | |
| H04N 19/117 | (2014.01) | |
| H04N 19/61 | (2014.01) | |
| H04N 19/186 | (2014.01) | |

(52) U.S. Cl.
CPC ......... *H04N 19/176* (2014.11); *H04N 19/186* (2014.11); *H04N 19/61* (2014.11)

(56) References Cited

U.S. PATENT DOCUMENTS

| | | | |
|---|---|---|---|
| 2005/0013370 A1 | 1/2005 | Kim | |
| 2005/0281473 A1* | 12/2005 | Kim | H04N 19/105 382/236 |
| 2007/0083578 A1 | 4/2007 | Chen et al. | |
| 2007/0154087 A1* | 7/2007 | Cho | H04N 19/105 382/166 |
| 2008/0008239 A1* | 1/2008 | Song | H04N 19/105 375/240.12 |
| 2008/0043840 A1* | 2/2008 | Song | H04N 19/593 375/240.11 |
| 2008/0089411 A1 | 4/2008 | Wenger et al. | |
| 2009/0110070 A1* | 4/2009 | Takahashi | H04N 19/176 375/240.12 |
| 2009/0232207 A1 | 9/2009 | Chen | |
| 2010/0128786 A1 | 5/2010 | Gao et al. | |
| 2010/0329342 A1* | 12/2010 | Joshi | H04N 19/105 375/240.16 |
| 2011/0122943 A1 | 5/2011 | Kadono | |
| 2011/0255591 A1 | 10/2011 | Kim et al. | |
| 2012/0307897 A1* | 12/2012 | Yang | H04N 19/50 375/240.12 |
| 2012/0328013 A1 | 12/2012 | Budagavi et al. | |
| 2013/0022120 A1 | 1/2013 | Gupte et al. | |
| 2013/0058404 A1 | 3/2013 | Guo et al. | |
| 2013/0188703 A1 | 7/2013 | Liu et al. | |
| 2013/0251028 A1 | 9/2013 | Au | |
| 2013/0272401 A1 | 10/2013 | Seregin et al. | |
| 2013/0336591 A1* | 12/2013 | Jeon | H04N 19/186 382/238 |

FOREIGN PATENT DOCUMENTS

| | | | |
|---|---|---|---|
| CN | 101426141 | 5/2009 | |
| CN | 101507277 | 8/2009 | |
| EP | 1478189 | 11/2004 | |
| EP | 1478189 A2 * | 11/2004 | ........... H04N 19/186 |
| JP | 09-2005652 | 9/2009 | |
| WO | 2008020687 | 2/2008 | |
| WO | WO-2008020687 A1 * | 2/2008 | ........... H04N 19/186 |
| WO | 2011088594 | 7/2011 | |
| WO | WO-2011088594 A1 * | 7/2011 | ........... H04N 19/103 |
| WO | 2013160700 | 10/2013 | |

OTHER PUBLICATIONS

Yeh et al., Second Order Residual Prediction for HEVC Inter Coding, APSIPA Proceedings 2014 (Year: 2014).*
Zhang et al. Chroma Intra Prediction Based on Inter-Channel Correlation for HEVC, IEEE Transactions on Image Processing, vol. 23, No. 1, Jan. 2014 (Year: 2014).*
Advisory Action for U.S. Appl. No. 14/244,364, dated Mar. 8, 2017.
EP Communication pursuant to Article 94(3) EPC, dated Jul. 1, 2016, for EP Patent Application No. 11875585.9.
Final Office Action for U.S. Appl. No. 13/977,420 dated Oct. 19, 2017.
Final Office Action for U.S. Appl. No. 14/244,364, dated Dec. 27, 2016.
Final Office Action for U.S. Appl. No. 14/244,411, dated Dec. 30, 2016.
Final Office Action, dated Jul. 28, 2016, for U.S. Appl. No. 13/977,420.
Non-Final Office Action dated Jun. 20, 2016, for U.S. Appl. No. 14/244,411.
Non-Final Office Action, dated Jun. 16, 2016, for U.S. Appl. No. 14/244,364.
Notice of Allowance for European Patent Application No. 11875585.9, dated Mar. 8, 2017.
Notice of Allowance for Japanese Patent Application No. 2016-080995, dated Sep. 14, 2017.
Notice of Allowance for Japanese Patent Application No. 2016-118753 dated Jul. 4, 2017.
Notice of Allowance for Taiwan Patent Application No. 103124782, dated Nov. 28, 2016.
Notice of Allowance for U.S. Appl. No. 13/977,420, dated Mar. 13, 2018.
Notice of Allowance for U.S. Appl. No. 14/244,364, dated May 10, 2018.
Office Action for Chinese Patent Application No. 201180074683.X, dated May 11, 2017.
Office Action for Chinese Patent Application No. 201180074683.X, dated Sep. 9, 2016.
Office Action for Chinese Patent Application No. 201410224832.1, dated Apr. 28, 2018.
Office Action for Chinese Patent Application No. 201410224832.1, dated Oct. 10, 2016.
Office Action for Japanese Patent Application No. 2014-121489, dated Jan. 19, 2016. Translation provided.
Office Action for Japanese Patent Application No. 2016-080995, dated May 9, 2017.
Office Action for U.S. Appl. No. 13/977,420, dated Apr. 6, 2017.
Office Action for U.S. Appl. No. 14/244,364 dated Oct. 2, 2017.
Office Action dated Jun. 16, 2016, for U.S. Appl. No. 14/244,364.
Search Report for EP Patent Application No. 11875585.9, dated Aug. 25, 2015.
Search Report for European Patent Application No. 11875585.9, dated May 28, 2015.
Search Report dated Apr. 27, 2016 for Taiwan Patent Application No. 103124782.
Second Office Action for Chinese Patent Application No. 201410224832.1, dated Jun. 28, 2017.
Third Office Action for Chinese Patent Application No. 201180074683.X dated Nov. 3, 2017.
"Preview document JCTVC-F095 for Torino Meeting", URL:http//phenix.itsudparis.eu/jct/doc_end_user/current_document.php?id=2558, Jul. 16, 2011.
Chiu, Yi-Jen et al., "Cross-channel intra chroma residual prediction", Joint Collaborative Team on Video Coding (JCT-VC) of ITU-T SG16 WP3 and ISO/IEC JTC1/SC29/WG11 7th Meeting: Geneva, CH, Nov. 21-30, 2011.
Chiu, Yi-Jen et al., "Cross-channel prediction refinement to improve intra chroma prediction", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.
Kawamura, Kei et al., "Chroma intra prediction based on residual luma samples", Joint Collaborative Team on Video Coding (JCT-VC) of ITU-T SG16 WP3 and ISO/IEC JTC1/SC29/WG11, 6th Meeting: Torino, IT, Jul. 14-22, 2011.
Kim, Woo-Shik et al., "Inter-plane prediction for RGB video coding", Image Processing, 2004, ICIP 2004 International Conference on Singapore Oct. 24-27, 2004, Piscataway, NJ, USA, IEEE vol. 2, Oct. 24, 2004, pp. 785-788, XP010785120, DOI: 978-0/7803-8554-2.
Lee, Sang Heon et al., "Intra Prediction Method Based on the Linear Relationship Between the Channels for YUV 420 Intra Coding", IEEE 2009, 16th IEEE Int'l Conf on Image Processing (ICIP), Nov. 10, 2009, pp. 1037-1040, section 2.1.
McCann, et al., "HM4: HEVC Test Model 4 Encoder Description", 6. JCT-VC Meeting; 97. MPEG Meeting; Jul. 14, 2011-Jul. 22,

(56) References Cited

OTHER PUBLICATIONS

2011; Torino (Joing Collaborative Team on Video Coding of ISO/IEC JTC1/SC29/WG11 and ITU-T SG.16); URL: http://WFTP3.ITU.INT/AV-ARCH/JCTVC-SITE/ No. JCTV-F802, Oct. 4, 2011 (XP030009799).

Sullivan, Gary et al., "Meeting report of the sixth meeting of the Joint Collaborative Team on Video Coding (JCT-VC), Torino, IT, Jul. 14-22, 2011", Joint Collaborative Team on Video Coding (JCT-VC) of ITU-T SG16 WP3 and ISO/IEC JTC1/SC29/WG11 6th Meeting: Torino, IT, Jan. 18, 2011 [JCTVC-F800], p. 140.

Wiegand, et al., "Overview of the H.264/AVC Video Coding Standard", IEEE Transactions on Circuits and systems for Video Technology, Jul. 2003.

Zhang, et al., "Multi-Order Residual (MOR) Video Coding: Framework, Analysis and Performance, Visual Communications and Image Processing 2010", Proc. of SPIE, vol. 7744 774411-1.

\* cited by examiner

CROSS-CHANNEL RESIDUAL PREDICTION

CROSS REFERENCE TO RELATED PATENT APPLICATION

The present application is a continuation of U.S. patent application Ser. No. 14/244,364, filed Apr. 3, 2014, now U.S. Pat. No. 10,075,709, issued on Sep. 11, 2018, and entitled "CROSS-CHANNEL RESIDUAL PREDICTION", which is a continuation of U.S. patent application Ser. No. 13/977,420, filed Oct. 9, 2013, now U.S. Pat. No. 10,015,485, issued on Jul. 3, 2018, and entitled "CROSS-CHANNEL RESIDUAL PREDICTION", which is a National Stage of International PCT Patent Application Serial No. PCT/CN2011/081862, filed Nov. 7, 2011, and entitled "CROSS-CHANNEL RESIDUAL PREDICTION", and claims priority therefrom, all of which are incorporated herein by reference in their entireties for all purposes.

BACKGROUND

High Efficiency Video Coding (HEVC) is a video compression standard currently under development by the Joint Collaborative Team on Video Coding (JCT-VC) formed by ISO/IEC Moving Picture Experts Group (MPEG) and ITU-T Video Coding Experts Group (VCEG). In the present HEVC specification, a picture is coded in a Largest Coding Unit (LCU). An LCU may be a 128×128 block, a 64×64 block, a 32×32 block or a 16×16 block. An LCU can be encoded directly or may be divided into four Coding Units (CUs) for next level encoding. A CU may be encoded directly or may be further divided into a next level for encoding. The smallest CU is an 8×8 block.

In general, at each level, a CU of size 2N×2N may be divided into Prediction Units (PU) for the purposes of prediction. For intra coding, a 2N×2N CU may be encoded in one 2N×2N PU or into four N×N PUs. For inter coding, a 2N×2N CU may be encoded in one 2N×2N PU, two 2N×N PUs, two N×2N PUs, a 0.5N×2N PU plus a 1.5N×2N PU, a 1.5N×2N PU plus a 0.5N×2N PU, a 2N×0.5N PU plus a 2N×1.5N PU, a 2N×1.5N PU plus a 2N×0.5N PU, or four N×N PUs. In color video where picture data may be distributed over three channels including a luminance (luma) channel Y and two chrominance (chroma) channels U and V, a PU may include one luma block Y and two chroma blocks U and V.

In an HEVC encoder, after intra prediction (Intra-frame Prediction module) or inter prediction (Motion Estimation & Motion Compensation modules) are performed, the prediction residuals corresponding to the difference between an input PU and the predicted PU are transformed and quantized for entropy coding. When a PU is encoded in intra coding mode, different intra prediction modes may be applied including DC prediction, planar prediction, horizontal prediction, vertical prediction and so forth.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
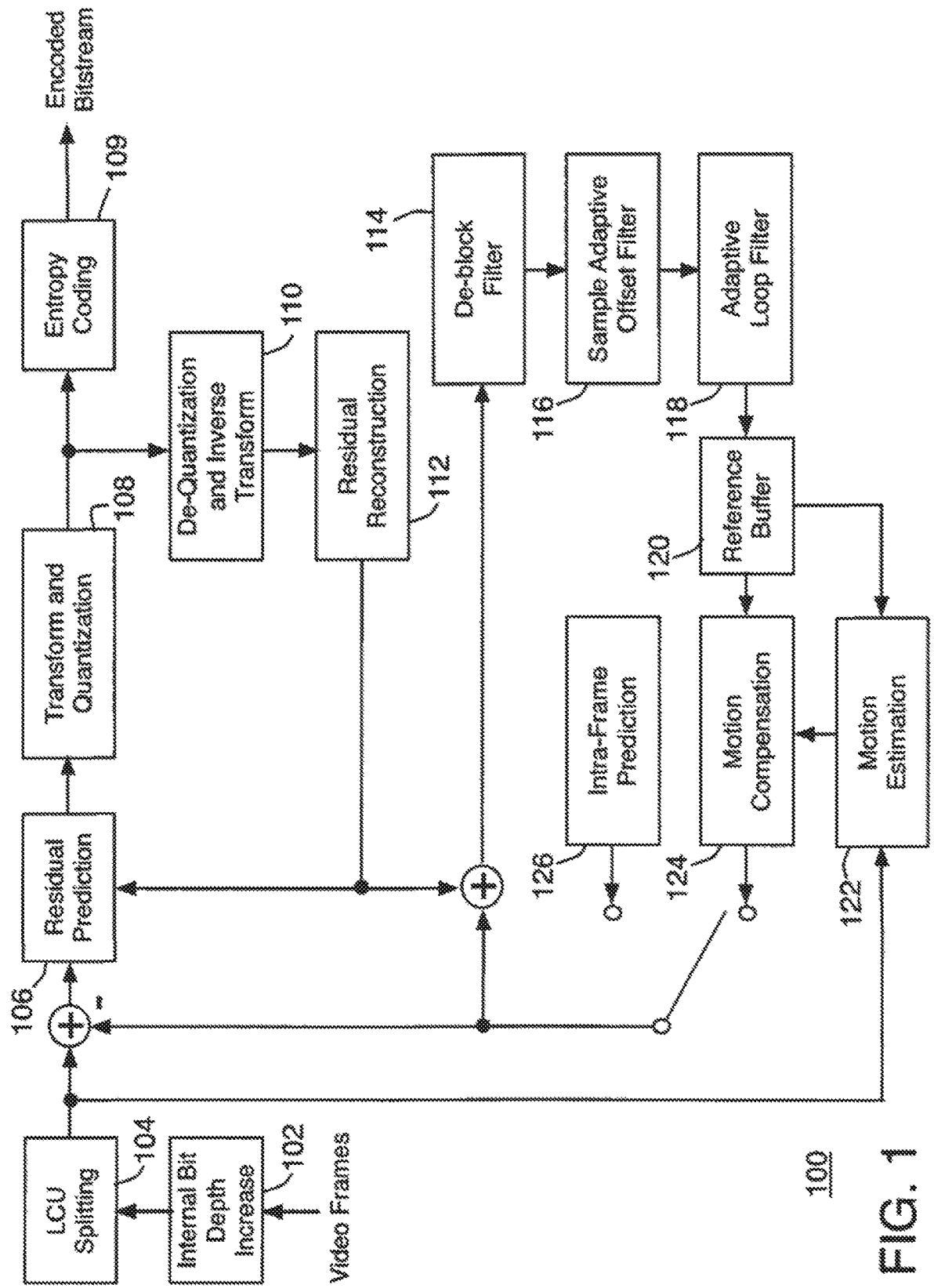
FIG. 1 is an illustrative diagram of an example video encoder system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example video encoder system 100 in accordance with the present disclosure. In various implementations, system 100 may be configured to undertake video coding and/or implement video codecs according to one or more advanced video codec standards, such as, for example, the H.264 standard (ISO/IEC JTC1 and ITU-T, "H.264/AVC—Advanced video coding for generic audiovisual services," ITU-T Recommendation H.264 and ISO/IEC 14496-10 (MPEG-4 part 10), version 3, 2005) and extensions thereof. Further, video encoder system 100 may be configured to undertake video coding and/or implement video codecs according to the High Efficiency Video Coding (HEVC) H.265 video compression standard being developed by the Joint Collaborative Team on Video Coding (JCT-VC) formed by ISO/IEC Moving Picture Experts Group (MPEG) and ITU-T Video Coding Experts Group (VCEG). Further, in various embodiments, video encoder system 100 may be implemented as part of an image processor, video processor, and/or media processor and may undertake inter prediction, intra prediction, predictive coding, and/or residual prediction including cross-channel residual prediction in accordance with the present disclosure.

In system 100, current video information may be provided to an internal bit depth increase module 102 in the form of a frame of video data. The current video frame may be split into Largest Coding Units (LCUs) at module 104 and then passed to a residual prediction module 106. The output of residual prediction module 106 may be subjected to known video transform and quantization processes by a transform and quantization module 108. The output of transform and quantization module 108 may be provided to an entropy coding module 109 and to an de-quantization and inverse transform module 110. De-quantization and inverse transform module 110 may implement the inverse of the operations undertaken by transform and quantization module 106 to provide the output of residual prediction module 106 to a residual reconstruction module 112. Those skilled in the art may recognize that transform and quantization modules and de-quantization and inverse transform modules as described herein may employ scaling techniques.

The output of residual reconstruction module 112 may be fed back to residual prediction module 106 and may also be provided to a loop including a de-blocking filter 114, a sample adaptive offset filter 116, an adaptive loop filter 118, a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the output of LCU splitting module 104 to act as input to residual prediction module 106.

As will be explained in greater detail below, residual prediction module 106 may act in conjunction with residual reconstruction module 112 to provide cross-channel residual prediction in accordance with the present disclosure. In various implementations, residual prediction module 106 may be used to generate prediction residuals for one channel of video data and residual reconstruction module 112 may reconstruct that channel's prediction residuals for use by residual prediction module 106 in generating the prediction residuals for another channel of video data. For example, residual prediction module 106 may be used to generate prediction residuals for a luminance (luma) channel of a prediction unit (PU) and residual reconstruction module 112 may reconstruct the luminance channel's prediction residuals for use by residual prediction module 106 in generating the prediction residuals for a chrominance (chroma) channel of the PU. In general, if any two of three channels use the same prediction type and/or the same prediction mode, resulting in possible correlation between the prediction residuals of the two channels, employing cross-channel residual prediction techniques as described herein may facilitate the removal of redundant information and allow for higher video coding efficiencies.

In various implementations, residual prediction may be performed on prediction residuals, and the resulting second-order prediction residuals between the initial prediction residuals and the predicted residuals may be transformed and quantized. In cross-channel residual prediction techniques in accordance with the present disclosure, if the residuals of a first channel (A) are to be predicted from the residuals of a second channel (B), the residuals of channel B as generated by residual prediction module 106 may be encoded (e.g., transformed & quantization) by transform and quantization module 108 and then reconstructed by de-quantization and inverse transform module 110 and residual reconstruction module 112 first, and then the reconstructed residuals of channel B may be used by residual prediction module 106 to subsequently predict the residuals of channel A.

Figure 2:
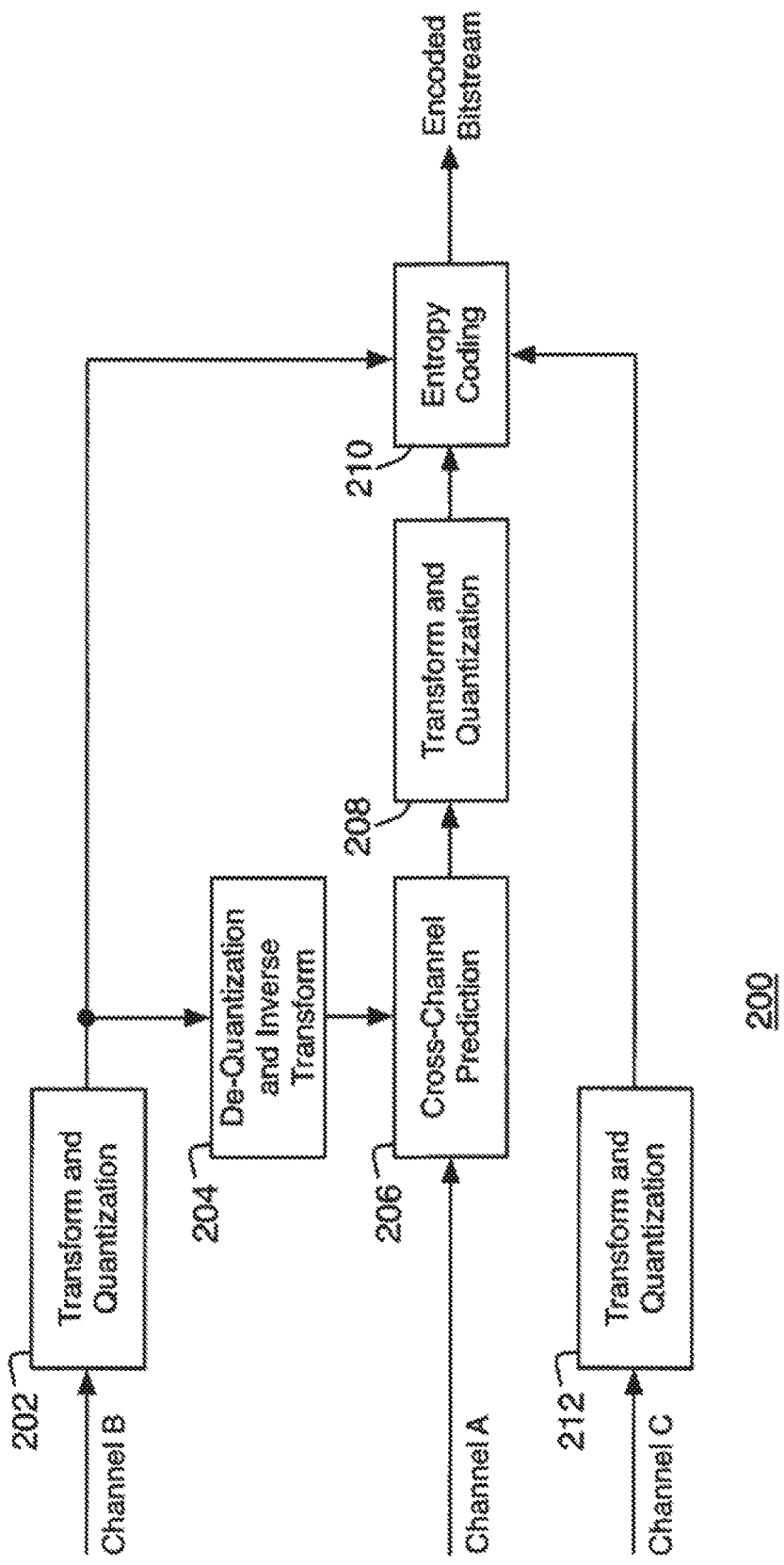
FIG. 2 illustrates an example cross-channel residual prediction scheme.

FIG. 2 illustrates an example cross-channel residual prediction scheme 200 in accordance with the present disclosure. In various implementations, system 100 of FIG. 1 may implement scheme 200. In scheme 200, the reconstructed predicted residuals of a first channel (B) are used to predict the residuals of a second channel (A) and then the encoded residuals of channel B and the resulting cross-channel predicted residuals of channel A (after being encoded) along with the encoded residuals of a third channel (C) are subjected to entropy encoding. In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

As depicted in scheme 200, the predicted residuals of channel B may be transformed and quantized at block 202 and then de-quantized and inverse transformed at block 204 before being provided as the reconstructed residuals of channel B to a cross-channel prediction block 206. At block 206, the reconstructed residuals of channel B may be used to predict the residuals of channel A. The predicted residuals of channel A may then be transformed and quantized at block 208 before being entropy coded at block 210 along with the transformed and quantized channel B residuals obtained from block 202, and the transformed and quantized (block 212) predicted residuals of channel C.

In accordance with the present disclosure, cross-channel residual prediction in accordance with the present disclosure (e.g., as undertaken at block 206) may employ a linear or a non-linear model and may utilize fixed or adaptively determined model parameters. For instance, for a pixel position k, the channel A residual value A(k) may be predicted from a reconstructed channel B residual value B'(k) of position k using the following expression:

$$A^P(k)=f(B'(k)) \quad (1)$$

where $A^P(k)$ is the predicted residual value, and $f(\cdot)$ may be a linear or non-linear function or transform. In various implementations, the parameters of $f(\cdot)$ may have predefined fixed values or may be determined adaptively using the generated or reconstructed residual values of at least some neighboring pixel positions. For instance, in various implementations, residual values for neighboring pixel positions may be used to build a linear or non-linear equation group for $f(\cdot)$. In such implementations, parameters of $f(\cdot)$ may be adaptively obtained from the residual values for the neighboring pixel positions using well known techniques such as, for example, linear least squares, non-linear least squares, weighted least squares or other well known optimization methods.

In general, linear residual prediction in accordance with the present disclosure using a linear form of $f(\cdot)$ may provide the following expression for residual value A(k):

$$A^P(k)=a*B'(k)+b \quad (2)$$

where a and b are model parameters. In various implementations, model parameters a and b may have fixed values, may be determined by a decoder, or may be determined by an encoder for transmission to a decoder.

In general, non-linear residual prediction in accordance with the present disclosure using a non-linear form of $f(\cdot)$ may provide the following expression for residual value A(k):

$$A^P(k)=a(k)*B'(k)+b(k) \quad (3)$$

where a(k) and b(k) are non-linear equation parameters. In various implementations, parameters a(k) and b(k) may be adaptively determined in response to the value of B'(k). For example, the range of possible values of B'(k) may be divided into M smaller subsets S(k) of residual values. Each subset S(k) may then be assigned different values for a(k) and b(k) to be used in Eq. (3) so that when the value of B'(k) for a particular residual position lies within a given subset S(k) the corresponding values for a(k) and b(k) may be applied to predict the residual value $A^P(k)$ for that position.

In general, in various implementations, linear or non-linear model parameters may be adaptively generated by a video encoder and/or decoder based on already decoded pixels in a current picture and/or in previously decoded pictures. Further, in various implementations, linear or non-linear model parameters may be adaptively generated by a video encoder and/or decoder based on input pixels of a current picture and the already encoded pixels in the current picture and/or encoded pixels in previously encoded pictures. A video encoder may determine model parameters and then encode and transmit the generated model parameters to a decoder for the decoder to use in undertaking cross-channel residual prediction schemes in accordance with the present disclosure.

In various implementations, a coding unit (CU) or PU may be processed according to various coding modes and/or prediction modes. For example, a CU may be encoded in intra mode or inter mode, and for intra mode, a PU may be processed using various prediction modes such as DC prediction, planar prediction, vertical prediction, horizontal prediction and other directional predictions. In accordance with the present disclosure, different cross-channel residual prediction schemes may be applied depending on the coding mode and/or prediction modes used. For example, in various implementations, linear cross-channel residual prediction may be applied for intra mode coding, while cross-channel residual prediction may not be applied for inter mode coding. Further, in various implementations, fixed parameter linear cross-channel residual prediction may be applied for intra vertical & horizontal prediction modes, while adaptive linear cross-channel residual prediction may be applied for DC, Planar and other directional prediction modes.

In various implementations, different model parameter generation schemes may be applied in different encoding modes. For example, different model parameter generation schemes may be applied in intra coding mode than are applied in inter coding mode. In addition, different model parameter generation schemes may be applied to different block sizes. Further, different intra prediction modes may use different model parameter generation schemes.

In various implementations, a flag, indicator or signal may indicate whether to apply adaptive residual prediction for a particular coding mode or prediction mode. For example, an encoder (e.g., system 100) may use one or more flags to indicate (e.g., on a per-CU and/or per-PU basis) whether to apply residual prediction or not for a particular coding mode or prediction mode. In various implementations, the value of such a flag (e.g., yes or no) may be decided based on rate-distortion cost. Further, in various implementations, it may be mandatory to apply residual prediction for a particular coding mode or prediction mode.

Those of skill in the art will recognize that when the input video data is in a YUV420 or YUV422 format, the residual block size of the U and V channels are smaller than the residual block size of the Y channel. In these cases, down-sampling may be applied to a Y channel residual block if it is to be used to predict U and/or V channel residual blocks, or up-sampling may be applied to U and/or V residual blocks if they are to used to predict a Y channel residual block. Further, while various implementations are described herein in the context of YUV color spaces, the present disclosure is not limited to particular video data formats or color spaces.

Figure 3:
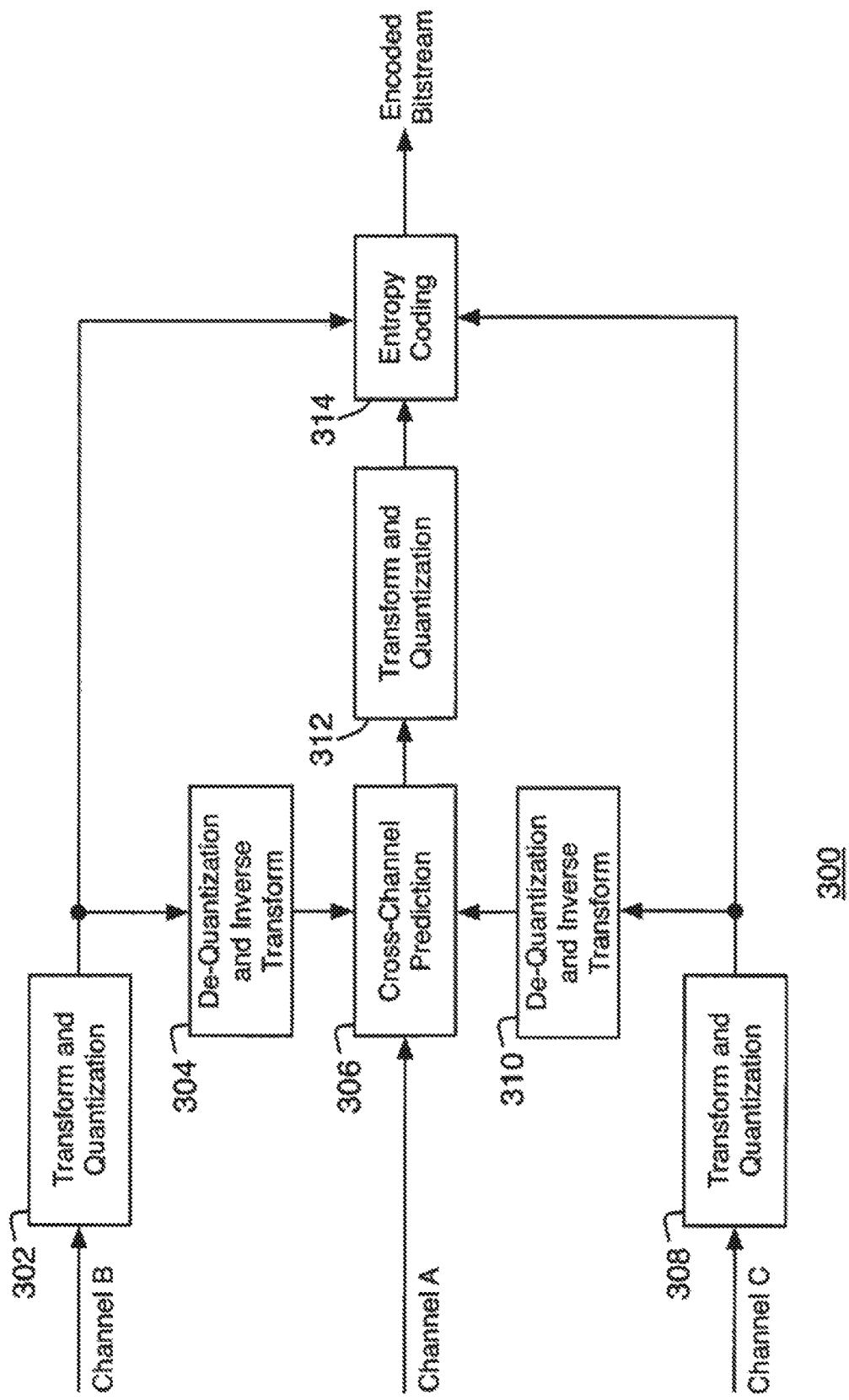
FIG. 3 illustrates another example cross-channel residual prediction scheme.

FIG. 3 illustrates another example cross-channel residual prediction scheme 300 in accordance with the present disclosure. In various implementations, system 100 of FIG. 1 may implement scheme 300. In scheme 300, the reconstructed predicted residuals of two channels (B and C) are used to predict the residuals of a third channel (A), and then the encoded residuals of channels B and C and the cross-channel predicted residuals of channel A (after being encoded) are subjected to entropy encoding. In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

As depicted in scheme 300, the predicted residuals of channel B may be transformed and quantized at block 302 and then de-quantized and inverse transformed at block 304 before being provided as reconstructed residuals to a cross-channel prediction block 306. Similarly, the predicted residuals of channel C may be transformed and quantized at block 308 and then de-quantized and inverse transformed at block 310 before also being provided as reconstructed residuals to cross-channel prediction block 306. At block 306, the reconstructed residuals of both channels B and C may be used to predict the residuals of channel A as described herein. The resulting predicted residuals of channel A may then be transformed and quantized at block 312 before being entropy coded at block 314 along with the encoded residuals of channels B and C.

Figure 4:
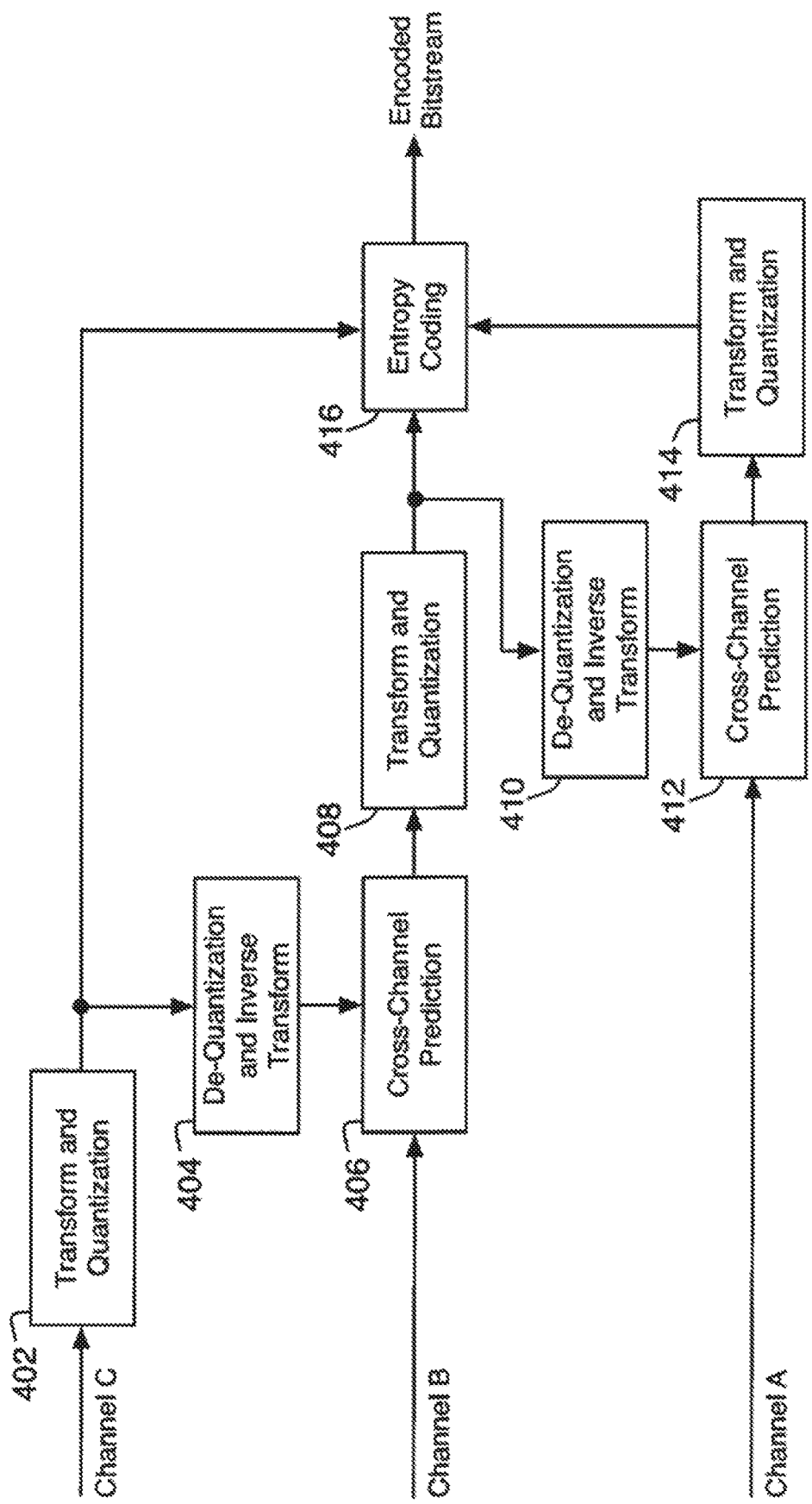
FIG. 4 illustrates another example cross-channel residual prediction scheme.

FIG. 4 illustrates another example cross-channel residual prediction scheme 400 in accordance with the present disclosure. In various implementations, system 100 of FIG. 1 may implement scheme 400. In scheme 400, the reconstructed predicted residuals of a first channel (C) are used to predict the residuals of a second channel (B), and then reconstructed cross-channel predicted residuals of channel B are used to predict the residuals of a third channel (A). The encoded residuals of all three channels A, B and C and are then subjected to entropy encoding. In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

As depicted in scheme 400, the predicted residuals of channel C may be transformed and quantized at block 402 and then de-quantized and inverse transformed at block 404 before being provided as reconstructed residuals to a first cross-channel prediction block 406. At block 406, the reconstructed residuals of channel C are used to predict the residuals of channel B. Then the cross-channel predicted residuals of channel B may be transformed and quantized at block 408 and then de-quantized and inverse transformed at block 410 before being provided as reconstructed residuals to a second cross-channel prediction block 412. At block 412, the reconstructed residuals of channel B are used to predict the residuals of channel A. The resulting cross-channel predicted residuals of channel A may then be transformed and quantized at block 414 before the encoded residuals of all three channels are entropy coded at block 416.

Figure 5:
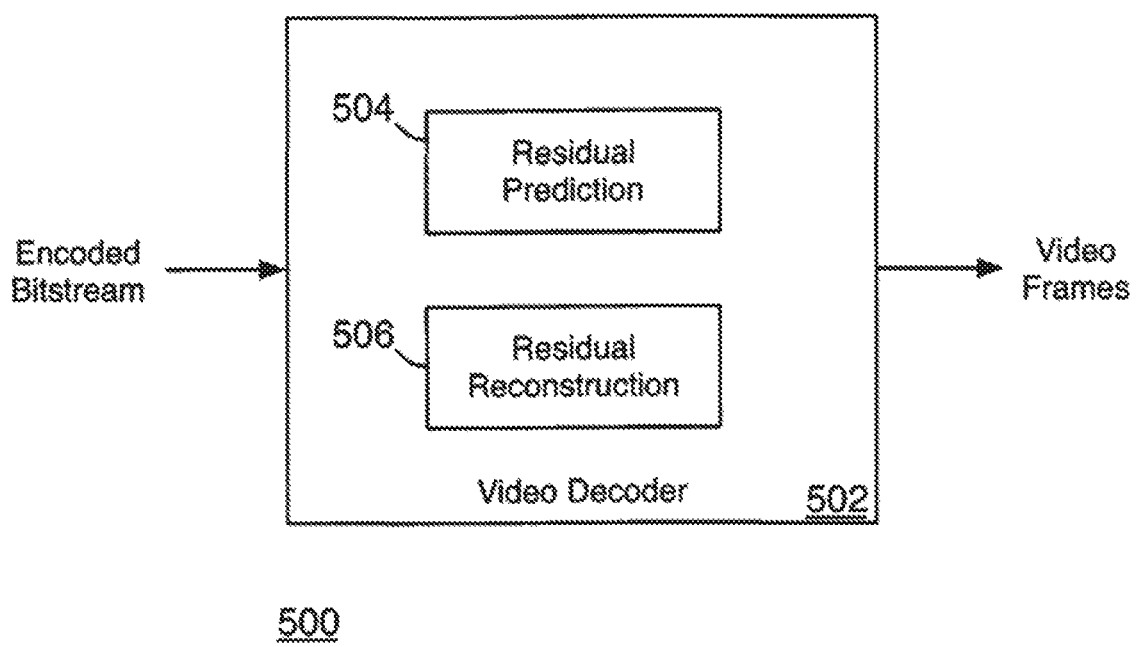
FIG. 5 is an illustrative diagram of an example video decoder system.

FIG. 5 illustrates an example video decoder system 500 in accordance with the present disclosure. In various implementations, system 500 may be configured to undertake video decoding and/or implement video codecs according to one or more advanced video codec standards, such as, for example, the H.264 standard and extensions thereof. Further, video decoder system 500 may be configured to undertake video coding and/or implement video codecs according to the HEVC H.265 video compression standard. Further, in various embodiments, video decoder system 500 may be implemented as part of an image processor, video processor, and/or media processor and may undertake inter prediction, intra prediction, predictive coding, and/or residual prediction including cross-channel residual prediction in accordance with the present disclosure.

In system 500, an encoded bitstream may be provided to a decoder module 502 that includes a residual prediction module 504 and a residual reconstruction module 506 that may implement cross-channel residual prediction in accordance with the present disclosure. In various implementations, residual prediction module 504 and residual reconstruction module 506 may be similar to residual prediction module 106 and residual reconstruction module 112 of system 100, respectively, and may provide similar functionality. As those skilled in the art may recognize, decoder 502 of system 500 may include various additional items (not depicted in FIG. 5 in the interests of clarity) such as a de-quantization and inverse transform module, an entropy decoding module, a motion compensation module and so forth.

In various implementations, an encoder in accordance with the present disclosure (e.g., system 100) may provide the encoded bitstream to decoder 502. When doing so, the encoder may include information in the bitstream, such as one or more mode flags, that may indicate whether decoder 502 should undertake cross-channel residual prediction as described herein for a given PU. For instance, the bitstream received by decoder 502 may include information, such as header information, that indicates whether decoder 502 is to apply adaptive cross-channel residual prediction for a particular coding mode or prediction mode. For example, an encoder (e.g., system 100) may use one or more flags to indicate (e.g., on a per-CU and/or per-PU basis) whether decoder 502 is to apply cross-channel residual prediction or not for a particular coding mode or prediction mode.

Figure 6:
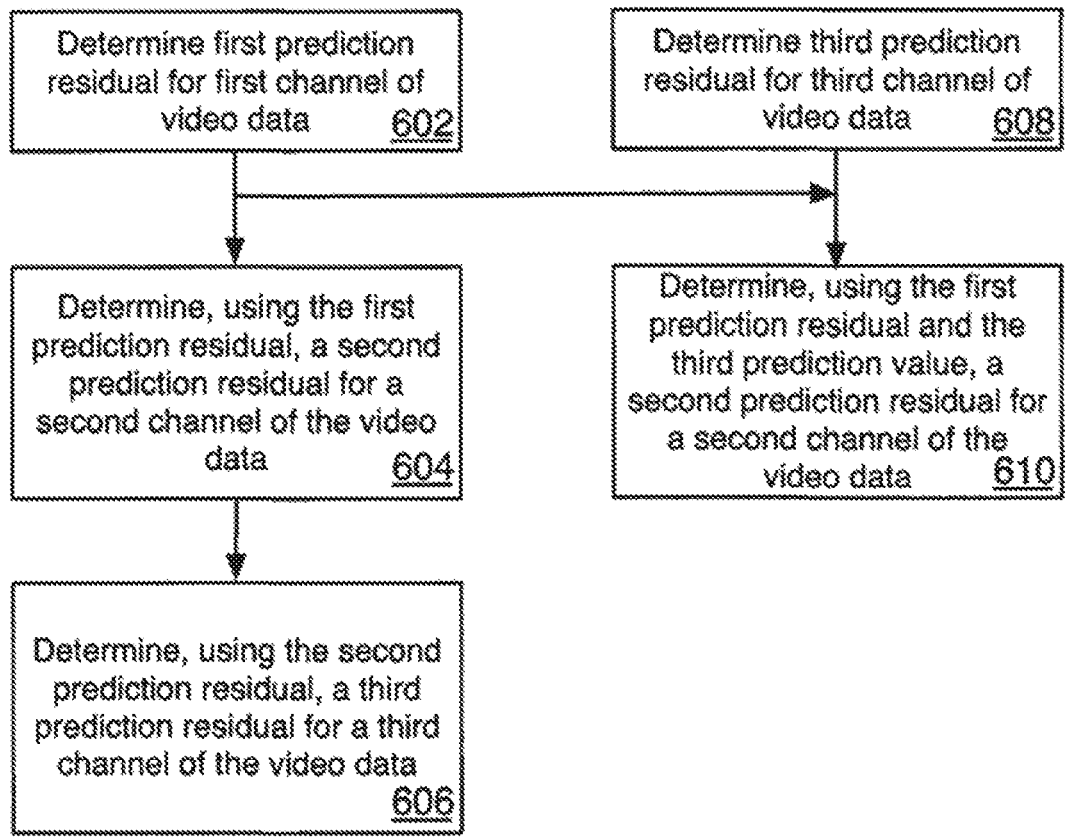
FIG. 6 is a flow chart of an example cross-channel residual prediction process.

FIG. 6 illustrates a flow diagram of an example process 600 for video encoding according to various implementations of the present disclosure. Process 600 may include one or more operations, functions or actions as illustrated by one or more of blocks 602, 604, 606, 608 and 610 of FIG. 6. By way of non-limiting example, process 600 will be described herein with reference to example video encoder system 100 of FIG. 1 and the example schemes of FIGS. 2-4.

Process 600 may begin at block 602 with the determination of a first prediction residual for a first channel of video data. For example, residual prediction module 106 may undertake block 602 for a channel (luma or chroma) of video data. At block 604, a second prediction residual for a second channel of the video data may be determined using the first prediction residual generated at block 602. For example, residual prediction module 106 may undertake block 604 for a different channel of the video data using the first prediction residual as provided by residual reconstruction module 112. In various implementations, if block 602 is undertaken for a luma channel, then block 604 may be undertaken for a chroma channel. Conversely, if block 602 is undertaken for a chroma channel, then block 604 may be undertaken for a chroma channel or a luma channel. In various implementations, blocks 602 and 604 may correspond to the implementation of blocks 202-206 of scheme 200 of FIG. 2.

Process 600 may continue at block 606 where a third prediction residual for a third channel of the video data may be determined using the second prediction residual. For example, residual prediction module 106 may undertake block 606 for a third channel of the video data using the second prediction residual as provided by residual reconstruction module 112 at block 604. In various implementations, if block 602 is undertaken for a luma channel, then block 604 may be undertaken for a chroma channel and block 606 may be undertaken for the other chroma channel. If block 602 is undertaken for a chroma channel and block 604 is undertaken for the other chroma channel, then block 606 may be undertaken for the luma channel. In various implementations, blocks 602, 604 and 606 may correspond to the implementation of blocks 302-306 and 308-310 of scheme 300 of FIG. 3.

Process 600 may also include block 608 where a third prediction residual may be determined for a third channel of video data. For example, residual prediction module 106 may undertake block 608 for a third channel of video data. At block 610, a second prediction residual for a second channel of the video data may be determined using the first prediction residual from block 602 and the third prediction value from block 608. For example, residual prediction module 106 may undertake block 610 for a second channel of the video data using both the first prediction residual and the third prediction residual as provided by residual reconstruction module 112 at blocks 602 and 608, respectively. In various implementations, if block 602 is undertaken for a luma channel, then block 608 may be undertaken for a chroma channel and block 610 may be undertaken for the other chroma channel. If block 602 is undertaken for a chroma channel and block 606 is undertaken for the other chroma channel, then block 610 may be undertaken for the luma channel. In various implementations, blocks 602, 608 and 610 may correspond to the implementation of blocks 402-412 of scheme 400 of FIG. 4.

Figure 7:
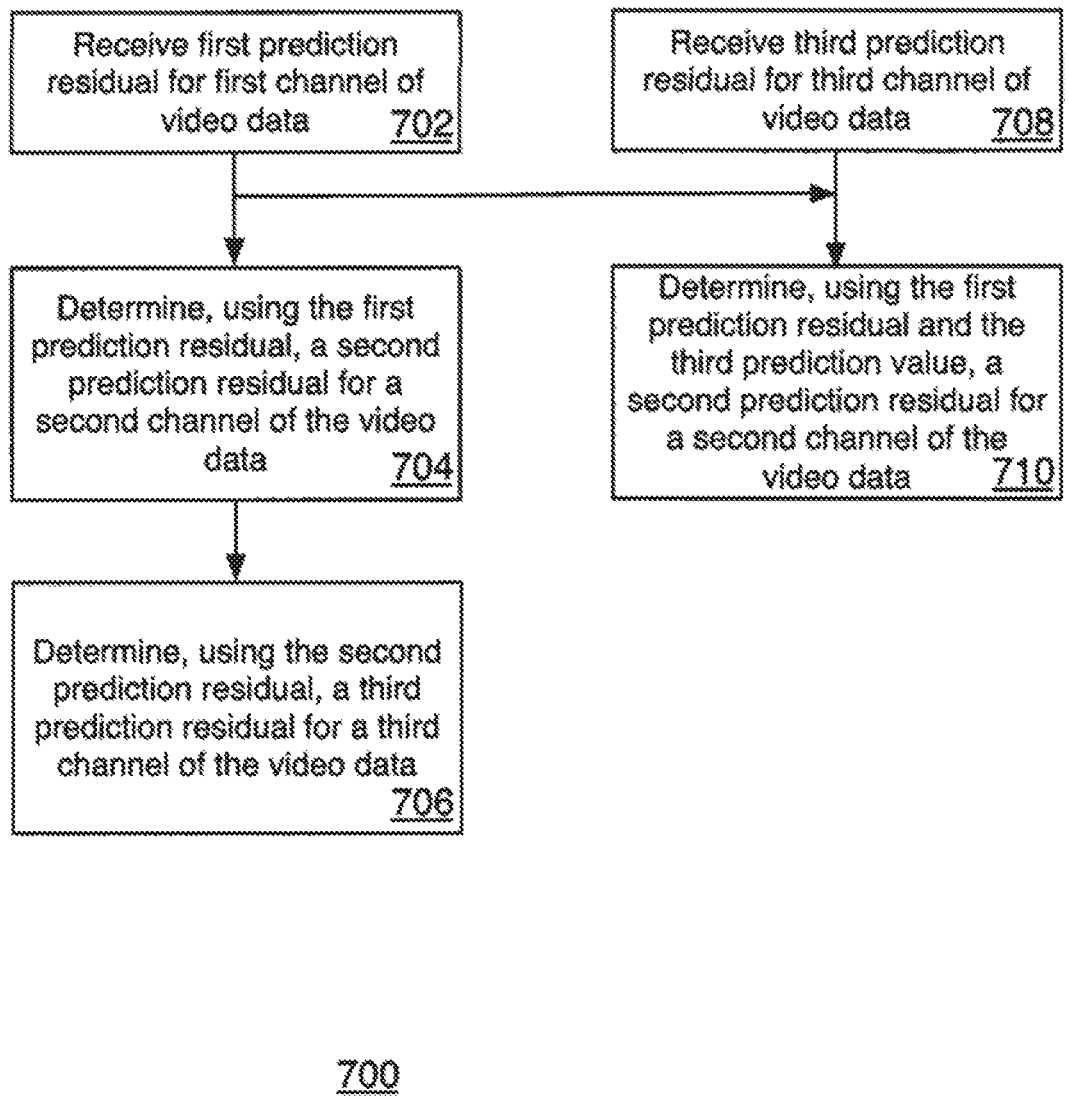
FIG. 7 is a flow chart of an example cross-channel residual prediction process.

FIG. 7 illustrates a flow diagram of an example process 700 for video decoding according to various implementations of the present disclosure. Process 700 may include one or more operations, functions or actions as illustrated by one or more of blocks 702, 704, 706, 708 and 710 of FIG. 7. By way of non-limiting example, process 700 will be described herein with reference to example video decoder system 500 of FIG. 5.

Process 700 may begin at block 702 where a first prediction residual for a first channel of video data may be received. For example, block 702 may involve decoder 502 decoding a received bitstream and using residual reconstruction module 506 to provide a reconstructed prediction residual for one channel of video data. At block 704, a second prediction residual for a second channel of the video data may be determined using the first prediction residual received at block 702. For example, residual prediction module 504 of decoder 502 may undertake block 704 for a different channel of the video data using the first prediction residual as provided by residual reconstruction module 112. In various implementations, if block 702 involves receiving a prediction residual for a luma channel, then block 704 may be undertaken for a chroma channel. Conversely, if block 702 involves receiving a prediction residual for a chroma channel, then block 704 may be undertaken for a chroma channel or a luma channel.

Process 700 may continue at block 706 where a third prediction residual for a third channel of the video data may be determined using the second prediction residual. For example, residual prediction module 504 may undertake block 706 for a third channel of the video data using the second prediction residual as provided by residual reconstruction module 506 at block 704. In various implementations, if block 702 involves receiving a prediction residual for a luma channel, then block 704 may be undertaken for a chroma channel and block 706 may be undertaken for the other chroma channel. If block 702 involves receiving a prediction residual for a chroma channel and block 704 is undertaken for the other chroma channel, then block 706 may be undertaken for the luma channel.

Process 700 may also include block 708 where a third prediction residual may be received where the third prediction residual corresponds to a third channel of video data. For example, block 708 may involve decoder 502 decoding a received bitstream and using residual reconstruction module 506 to provide a reconstructed prediction residual for a third channel of video data. At block 710, a second prediction residual for a second channel of the video data may be determined using the first prediction residual received at block 702 and the third prediction value received at block 708. For example, residual prediction module 504 may undertake block 710 for a second channel of the video data using both the first prediction residual and the third prediction residual as provided by residual reconstruction module 506 at blocks 702 and 708, respectively. In various implementations, if block 702 is undertaken for a luma channel, then block 708 may be undertaken for a chroma channel and block 710 may be undertaken for the other chroma channel. If block 702 is undertaken for a chroma channel and block 706 is undertaken for the other chroma channel, then block 710 may be undertaken for the luma channel.

While implementation of example processes 600 and 700, as illustrated in FIGS. 6 and 7, may include the undertaking of all blocks shown in the order illustrated, the present disclosure is not limited in this regard and, in various examples, implementation of processes 600 and 700 may include the undertaking only a subset of the blocks shown and/or in a different order than illustrated.

In addition, any one or more of the blocks of FIGS. 6 and 7 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 6 and 7 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
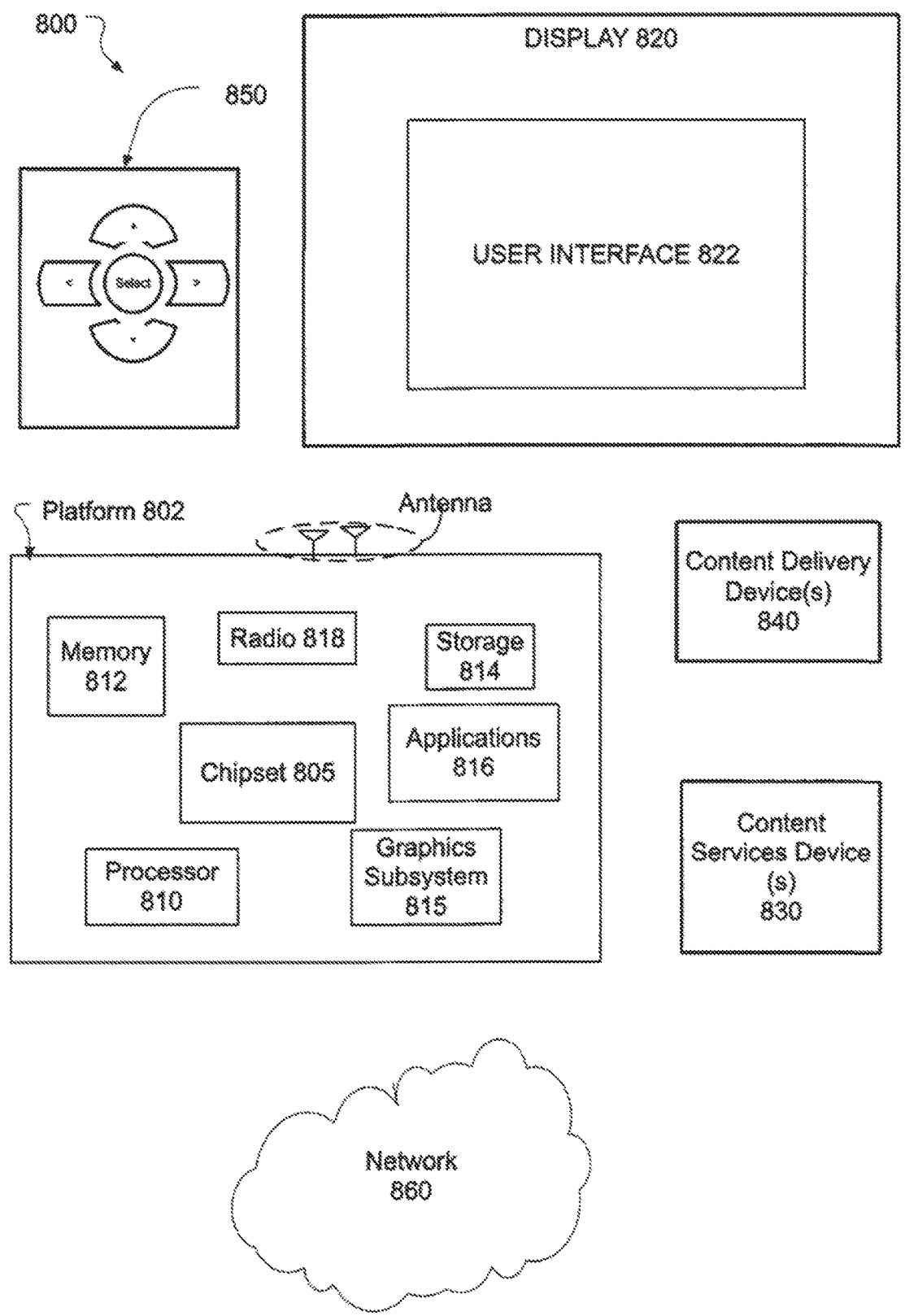
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
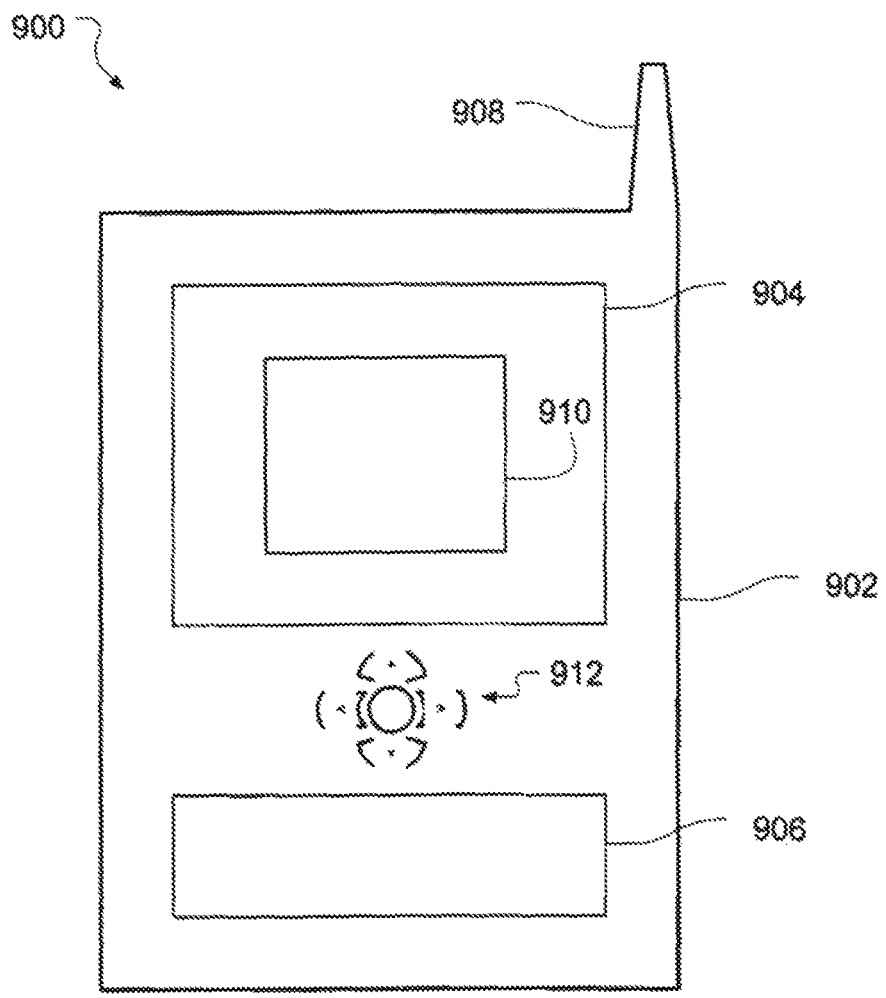
FIG. 9 is an illustrative diagram of an example system, all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A system comprising:
   a memory; and
   a processor coupled to the memory, the processor to:
   determine a reconstructed residual value for a first channel of video data at a particular pixel position within a picture;
   determine, using the reconstructed residual value, a predicted residual value at the particular pixel position for a second channel of the video data, wherein the processor to determine the predicted residual value comprises the processor to:
   determine the reconstructed residual value is within a particular subset of a plurality of subsets into which a codec dependent range of possible reconstructed residual values for the first channel has been divided, wherein each of the subsets is assigned a first and a second cross channel residual prediction model parameter; and
   predict the predicted residual value using particular first and second cross channel residual prediction model parameters corresponding to the particular subset by multiplying the reconstructed residual value by the particular first cross channel residual prediction model parameter and adding the particular second cross channel residual prediction model parameter.

2. The system of claim 1, the processor to:
   determine a second reconstructed residual value for the first channel at a second particular pixel position within the picture; and
   determine, using the second reconstructed residual value, a second predicted residual value at the second particular pixel position for the second channel, wherein the processor to determine the second predicted residual value comprises the processor to:
   determine the second reconstructed residual value is within a second particular subset of the plurality of subsets different than the particular subset; and
   predict the second predicted residual value using second particular first and second linear cross channel residual prediction model parameters corresponding to the second particular subset.

3. The system of claim 1, the processor to:
   decode the reconstructed residual value from an encoded bitstream.

4. The system of claim 3, wherein the assigned first and second cross channel residual prediction model parameters for the subsets are received via an encoder.

5. The system of claim 1, the processor to:
   transform and quantize the reconstructed residual value for the first channel.

6. The system of claim 1, wherein when the first channel comprises a luma channel, the second channel comprises a chroma channel and when the first channel comprises a chroma channel, the second channel comprises one of a luma channel or another chroma channel.

7. A computer-implemented method, comprising:
   determining a reconstructed residual value for a first channel of video data at a particular pixel position within a picture;
   determining, using the reconstructed residual value, a predicted residual value at the particular pixel position for a second channel of the video data by:
   determining the reconstructed residual value is within a particular subset of a plurality of subsets into which a codec dependent range of possible reconstructed residual values for the first channel has been divided, wherein each of the subsets is assigned a first and a second cross channel residual prediction model parameter; and
   predicting the predicted residual value using particular first and second cross channel residual prediction model parameters corresponding to the particular subset by multiplying the reconstructed residual value by the particular first cross channel residual prediction model parameter and adding the particular second cross channel residual prediction model parameter.

8. The method of claim 7, further comprising:
   determining a second reconstructed residual value for the first channel at a second particular pixel position within the picture; and
   determining, using the second reconstructed residual value, a second predicted residual value at the second particular pixel position for the second channel:
   determining the second reconstructed residual value is within a second particular subset of the plurality of subsets different than the particular subset; and
   predicting the second predicted residual value using second particular first and second cross channel residual prediction model parameters corresponding to the second particular subset.

9. The method of claim 7, further comprising:
   decoding the reconstructed residual value from an encoded bitstream.

10. The method of claim 9, wherein the assigned first and second cross channel residual prediction model parameters for the subsets are received via an encoder.

11. The method of claim 7, further comprising:
    transforming and quantizing the reconstructed residual value for the first channel.

12. The method of claim 7, wherein when the first channel comprises a luma channel, the second channel comprises a chroma channel and when the first channel comprises a chroma channel, the second channel comprises one of a luma channel or another chroma channel.

13. At least one non-transitory computer readable medium, comprising instructions stored thereon, which when executed by a computer, cause the computer to code video by:

determining a reconstructed residual value for a first channel of video data at a particular pixel position within a picture;

determining, using the reconstructed residual value, a predicted residual value at the particular pixel position for a second channel of the video data by:

determining the reconstructed residual value is within a particular subset of a plurality of subsets into which a codec dependent range of possible reconstructed residual values for the first channel has been divided, wherein each of the subsets is assigned a first and a second cross channel residual prediction model parameter; and predicting the predicted residual value using particular first and second cross channel residual prediction model parameters corresponding to the particular subset by multiplying the reconstructed residual value by the particular first cross channel residual prediction model parameter and adding the particular second cross channel residual prediction model parameter.

14. The non-transitory computer readable medium of claim 13, further comprising instructions stored thereon, which when executed by the computer, cause the computer to code video by:

determining a second reconstructed residual value for the first channel at a second particular pixel position within the picture; and determining, using the second reconstructed residual value, a second predicted residual value at the second particular pixel position for the second channel:

determining the second reconstructed residual value is within a second particular subset of the plurality of subsets different than the particular subset; and predicting the second predicted residual value using second particular first and second cross channel residual prediction model parameters corresponding to the second particular subset.

15. The non-transitory computer readable medium of claim 13, further comprising instructions stored thereon, which when executed by the computer, cause the computer to code video by:

decoding the reconstructed residual value from an encoded bitstream.

16. The non-transitory computer readable medium of claim 15, wherein the assigned first and second cross channel residual prediction model parameters for the subsets are received via an encoder.

17. The non-transitory computer readable medium of claim 13, further comprising:

transforming and quantizing the reconstructed residual value for the first channel.

18. The non-transitory computer readable medium of claim 13, wherein when the first channel comprises a luma channel, the second channel comprises a chroma channel and when the first channel comprises a chroma channel, the second channel comprises one of a luma channel or another chroma channel.

* * * * *